(12) United States Patent
Narita et al.

(10) Patent No.: US 6,819,026 B2
(45) Date of Patent: Nov. 16, 2004

(54) INDUCTION MOTOR

(75) Inventors: Kenji Narita, Kawasaki (JP); Takushi Fujioka, Kawasaki (JP); Yusuke Kikuchi, Kawasaki (JP); Akihiro Ito, Kawasaki (JP); Youichi Tanabe, Kawasaki (JP); Yuji Souma, Kawasaki (JP); Ken Maeyama, Kawasaki (JP); Michihiro Shibamoto, Kawasaki (JP); Nopporn Jirojjaturonn, Kawasaki (JP); Chanaporn Thanathitipong, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 10/413,147

(22) Filed: Apr. 15, 2003

(65) Prior Publication Data

US 2003/0201686 A1 Oct. 30, 2003

(30) Foreign Application Priority Data

Apr. 30, 2002 (JP) ......................................... 2002-128525
Feb. 19, 2003 (JP) ......................................... 2003-041238

(51) Int. Cl.$^7$ ................................................. H02K 1/22
(52) U.S. Cl. ........................ 310/266; 310/184; 310/198
(58) Field of Search ................................. 310/266, 264, 310/261, 254, 112, 113, 179, 180, 184, 187, 198, 211; 29/296–598

(56) References Cited

U.S. PATENT DOCUMENTS

| 5,554,903 A | * | 9/1996 | Takara | ......................... 310/266 |
| 5,783,893 A | * | 7/1998 | Dade et al. | ................. 310/266 |

\* cited by examiner

Primary Examiner—Nicholas Ponomarenko
Assistant Examiner—Leda Pham
(74) Attorney, Agent, or Firm—Manabu Kanesaka

(57) ABSTRACT

A radial-air-gap induction motor is constituted so as to have two air gaps by setting a rotor between a cylindrical outer stator and inner stator in order to improve an efficiency by increasing the ratio of torque/(square of current) by a two air gaps, apply windings for generating a rotating magnetic field to the outer and inner stators, and form squirrel-cage windings on the rotor.

13 Claims, 15 Drawing Sheets

INDUCTION MOTOR

TECHNICAL FIELD

The present invention relates to a radial-air-gap induction motor used as a fan motor of an air conditioner, particularly to an induction motor having two stators and provided with a two radial air gaps constituted by setting a rotor between the stators.

BACKGROUND ART

Most induction motors respectively use the inner rotor type constituted by setting one rotor at the inside of one stator for generating a rotating magnetic field. The stator is provided with windings in order to generate a rotating magnetic field and the rotor is provided with case windings for generating an induced current.

In the case of the above induction motor, when setting the rotor in the rotating magnetic field of the stator, an induced current circulates through the case windings of the rotor, a rotating torque works on the case windings due to the mutual action between the rotating magnetic field and the induced current and thereby, the rotor rotates. This type of the induction motor is frequently used for electrical home appliances and industrial machines from the viewpoints of simplicity and economical efficiency.

In the case of a conventional induction motor, however, a loss tends to increase and an efficiency tends to deteriorate for an output as the motor is further decreased in size and moreover, the trend of the efficiency deterioration becomes stronger as the number of poles of the motor increases.

The relation shown by the following expression (1) is present between efficiency, loss, output, and input.

$$\text{Efficiency} = \text{Output}/\text{input} = \text{Output}/\text{output} + \text{Loss} \tag{1}$$

Therefore, it is found that a loss should be decreased in order to improve an efficiency. The loss of an induction motor includes the following.

<1> Primary copper loss (Copper loss; Stator winding resistance loss)
<2> Secondary copper loss (Rotor winding resistance loss)
<3> Iron loss (Core loss; Hysteresis loss)
<4> Iron loss (Eddy current loss)
<5> Mechanical loss (Bearing loss or windage loss)
<6> Stray load loss The primary copper loss in <1> and the secondary copper loss in <2> account for a large ratio among the above <1> to <6>. To reduce these copper losses of a conventional induction motor, it is necessary to use one of a method for reducing a resistance loss by increasing a stator core in size and a groove (slot) area and coiling a winging having a large wire diameter and a method for increasing the outer diameter of a rotor core so that the same torque can be output even by a small induced current. However, these methods are not preferable because the material cost is greatly increased.

In general, the output equation of a motor is shown by the following expression (2).

$$\text{Output} = K_1 \cdot D^2 \cdot L \cdot Bm \cdot Ac \cdot n \tag{2}$$

In the above expression, $K_1$ denotes a constant, D denotes the diameter of a radial air gap, L denotes the length of a core, Bm denotes the average magnetic-flux density of an air gap, Ac denotes the number of ampere conductors, and n denotes a rotating speed.

In the case of an induction motor, the average magnetic-flux density Bm of an air gap is almost proportional to the number of ampere conductors Ac. Therefore, the above expression (2) can be shown as the following expression (3).

$$\text{Output} = K_2 \cdot D^2 \cdot L \cdot Bm^2 \cdot n \tag{3}$$

In the above expression, $K_2$ is a constant.

Then, the relation between a loss and the average magnetic-flux density Bm of an air gap is studied below. A current I is almost proportional to a maximum magnetic-flux density B. The number of ampere conductors Ac is almost proportional to the current I and the average magnetic-flux density Bm of an air gap is almost proportional to the maximum magnetic-flux density B. Therefore, it can be considered that the primary copper loss (current $I^2$·winding resistance) in the above <1> almost proportional to $Bm^2$.

Moreover, the secondary copper loss in the above <2> is equal to (secondary current circulating through a rotor winding)·secondary resistance and the secondary current is almost proportional to Bm. Therefore, it can be said that the secondary copper loss in the above <2> is almost proportional to $Bm^2$.

It is publicly known that the iron loss (hysteresis loss) in the above <3> and the iron loss (eddy current loss) in the above <4> are almost proportional to $B^2$, that is, $Bm^2$. Because it is estimated that the mechanical loss (bearing loss or windage loss) in the above <5> and the stray load loss in the above <6> account for a small rate in the total loss, it can be said that the total loss is almost proportional to $Bm^2$.

To greatly improve an efficiency, it is necessary to minimize losses. Because a loss is almost proportional to the square of the average magnetic-flux density Bm ($Bm^2$) of an air gap, it is necessary to greatly reduce $Bm^2$ in order to greatly reduce the loss. However, because by reducing $Bm^2$, an output is also reduced proportionally to $Bm^2$, it is necessary to use means for compensating the output.

As a method for realizing the above mentioned, it is possible to keep an output constant because $(Bm^2) \times (D^2 \cdot L)$ becomes constant by increasing the square of (diameter D of radial air gap)×core length L by a value equivalent to the decrease of $Bm^2$. However, it is uneconomic to increase $(D^2 \cdot L)$ in a conventional induction motor because a core size (constitution) increases.

Therefore, it is a problem of the present invention to greatly improve the efficiency of an induction motor without increasing the core size (constitution).

SUMMARY OF THE INVENTION

To solve the above problem, the present invention uses an induction motor having a radial air gap, which is constituted so as to have a two air gaps and in which windings for generating a rotating magnetic field for the above rotor is set to the above outer and inner stators, and squirrel-cage windings are set to the rotor.

Thus, by forming the radial air gaps and maximizing the diameter of each air gap, it is possible to greatly increase $(D^2 \cdot L)$. Therefore, it is also possible to greatly reduce $Bm^2$ and thereby greatly reduce losses. Therefore, it is possible to improve an efficiency without increasing the core size (constitution). The output equation when forming the radial air gaps is shown by the following expression (4).

$$\text{Output} = K_2 \cdot (Do^2 + Di^2) \cdot L \cdot Bm^2 \cdot n \tag{4}$$

In the above expression, Do denotes the diameter of the outer radial air gap and Di denotes the diameter of the inner radial air gap.

It is preferable that the number of slots of the outer stator is equal to or different from the number of slots of the inner stator and the number of slots of the above rotor is equal to prime number×2 or prime number×4. Thereby, a squirrel-cage winding rotor becomes suitable for an induction motor.

It is preferable to make the pitch between windings applied to the inside of the above outer stator equal to or different from the pitch between windings applied to the outside of the above inner stator. Thereby, an induction motor suitable for a purpose is realized.

According to the present invention, it is possible to realize a capacitor induction motor in which an induced current circulates through the squirrel-cage windings of a rotor in accordance with a rotating magnetic field generated in each stator by applying the same numbers of or different numbers of slots to the above outer and inner stators, relatively shifting a spatial phase angle by $\pi/2$ in terms of an electrical angle, applying main windings and auxiliary windings to the teeth formed at the inside of the outer stator in the form of a concentrated windings, applying a main windings and an auxiliary windings to the grooves formed at the outside of the inner stator in the form of a distributed winding or concentrated winding, and generating a rotating magnetic field in each stator.

In FIGS. 4 to 6, according to the present invention, a main windings and auxiliary windings are alternately applied to teeth constituting 12 slots of the above outer stator and the main windings and the auxiliary windings are connected in series so that the adjacent main and auxiliary windings generate magnetic fluxes opposite to each other.

Three main windings and three auxiliary windings at a two-slot pitch are sequentially applied to grooves constituting 12 slots of the above inner stator every other slot so that the main windings and auxiliary windings are provided by being shifted by one slot from each other, and the main and auxiliary windings are connected in series so as to generate same-directional magnetic fluxes.

Then, a six-pole capacitor induction motor is obtained by connecting the main windings of the outer stator with those of the inner stator in series so as to be used as the main windings of the capacitor induction motor and connecting the auxiliary windings of the outer stator with that of the inner stator in series so as to be used as the auxiliary windings of the capacitor induction motor.

Moreover, it is possible to realize a capacitor induction motor in which an induced current circulates through the squirrel-cage windings of the above rotor by applying the same number of slots to the above outer stator and inner stator, making the teeth formed at the inside of the outer stator face the teeth formed at the outside of the inner stator, and applying a main winding and auxiliary winding to each tooth of the outer and inner stators in the form of a concentrated winding to generate a rotating magnetic field in each stator.

In FIGS. 9 to 11, according to the present invention, six main windings and six auxiliary windings are alternately applied to teeth constituting 12 slots of the above outer stator and six main windings and six auxiliary windings are alternately applied to teeth constituting 12 slots of the above inner stator the same as the case of the outer stator.

Then, the auxiliary windings of the outer stator and those of the inner stator are connected in series so that the windings generate the same-directional magnetic fluxes and directions of magnetic fluxes generated by the adjacent auxiliary windings are opposite to each other.

Then, the auxiliary windings of the outer stator and those of the inner stator are connected in series so that the windings generate the same-directional magnetic fluxes and magnetic fluxes generated by the adjacent auxiliary windings are faced to each other.

Thereby, a six-pole capacitor induction motor can be obtained by using the main windings of the outer and inner stators connected in series as the main windings of the capacitor induction motor and the auxiliary windings of the outer and inner stators connected in series as the auxiliary winding of the capacitor induction motor.

A three-phase induction motor in which an induced current circulates through the squirrel-cage windings of the above rotor is realized by applying the same number of slots to the above outer and inner stators, making the teeth formed at the inside of the outer stator face the teeth formed at the outside of the inner stator and applying three-phase windings to the teeth of the outer and inner stators in the form of a concentrated winding to generate a rotating magnetic field.

In FIGS. 12 to 14, according to the present invention, a three-phase winding is sequentially applied to each tooth of the above outer stator and a three-phase winding same as the case of the outer stator is sequentially applied to each tooth of the above inner stator.

For windings at these phases, the winding of the outer stator and those of the inner stator are alternately connected to each other in series and the windings of the outer stator and the windings of the faced inner stator are set so as to generate the same-directional magnetic fluxes and so that opposite-directional magnetic fluxes are generated by adjacent windings. By Y-connecting the windings at the phases connected in series, a three-phase induction motor can be obtained.

It is preferable to insulate cores of the above outer and inner stators and then, maintain a coil or insert the coil into a slot by an inserter, or directly apply a winding to a tooth, or apply a toroidal winding to the yoke portion of a stator. Thus, by using a winding suitable for the characteristic of an induction motor, an optimum induction motor is obtained.

It is preferable to constitute the above rotor by a core having at least teeth and a slot and a squirrel-cage winding formed through the slot, constitute the core by automatically laminating electromagnetic steel plates in the axial direction of a rotor shaft in a press die, and form a squirrel-cage winding on the slot by a conductive metal. Thereby, it is possible to manufacture an induction motor by using a conventional manufacturing system and prevent the cost from rising.

It is preferable to integrally solidify the above outer and inner stators respectively provided with windings with a thermosetting resin and fix them to the inside of a bracket. Moreover, it is preferable to fix the above outer stator to the inner diameter fitting portion of the bracket and the above inner stator to the inner face of the bracket or the bearing housing portion of the shaft by a holding portion. Thereby, the reliability of the induction motor is improved because the stators are securely fixed to the bracket.

In the case of the slot of the above rotor core, the outer end or inner end is formed into an open shape or both the outer and inner ends are formed into an open shape or closed shape. When either or both of them is or are formed into an open shape, a part of a core laminated sheet is formed into a closed slot. Thereby, because not-continuous independent teeth are formed on the rotor, a magnetic flux is effectively used and the efficiency of the motor is improved.

In the case of the above rotor, by casting an aluminum die-cast in a slot and forming squirrel-cage windings so that it is integrated with an end rings and applying a joint to at least one-hand end ring and fixing the joint to a rotor shaft, it is possible to easily manufacture the squirrel-cage windings and cut the cost.

Moreover, by forming cores of the above rotor into open slots and connecting all teeth each other by a ring arm, magnetic fluxes are concentrated on the teeth and a magnetic-flux density is raised and therefore, an efficiency can be further improved.

DETAILED DESCRIPTION

Then, embodiments of the present invention are described below by referring to the accompanying drawings. An induction motor of the present invention has a structure in which a portion corresponding to a conventional rotor yoke is used for a stator of the innermost diameter side and a rotor is set between the outer stator of the outermost diameter side and the inner stator of the innermost diameter side to form a two-layer radial air gaps. Therefore, losses are greatly reduced and a high efficiency is realized by applying windings to two stators so as to decrease a magnetic resistance while decreasing a stator-winding resistance, and increasing $(Do^2+Di^2) \cdot L$ and decreasing $Bm^2$.

Figure 1:
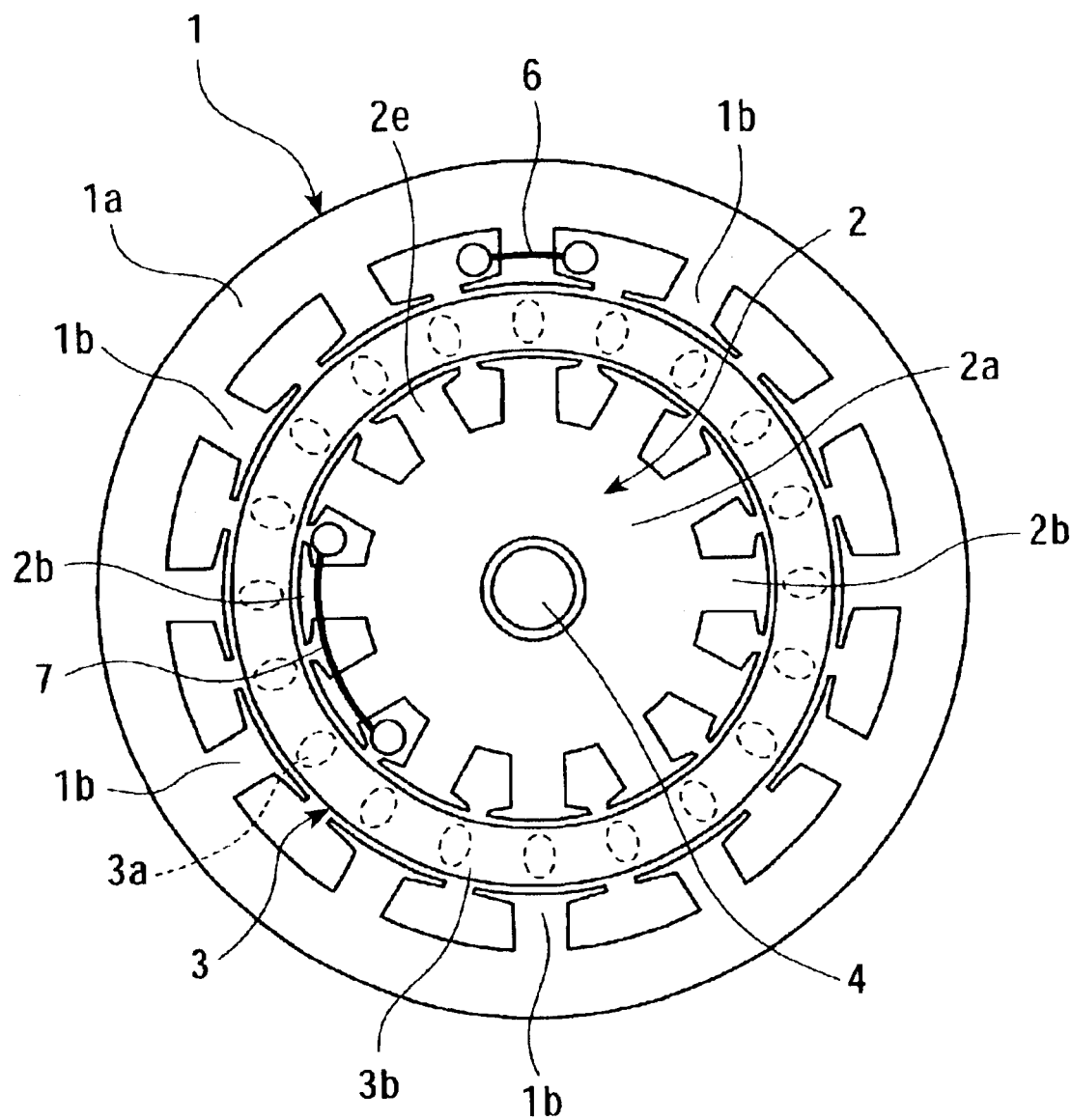
FIG. 1 is a schematic top view of an embodiment of an induction motor of the present invention.
Figure 2:
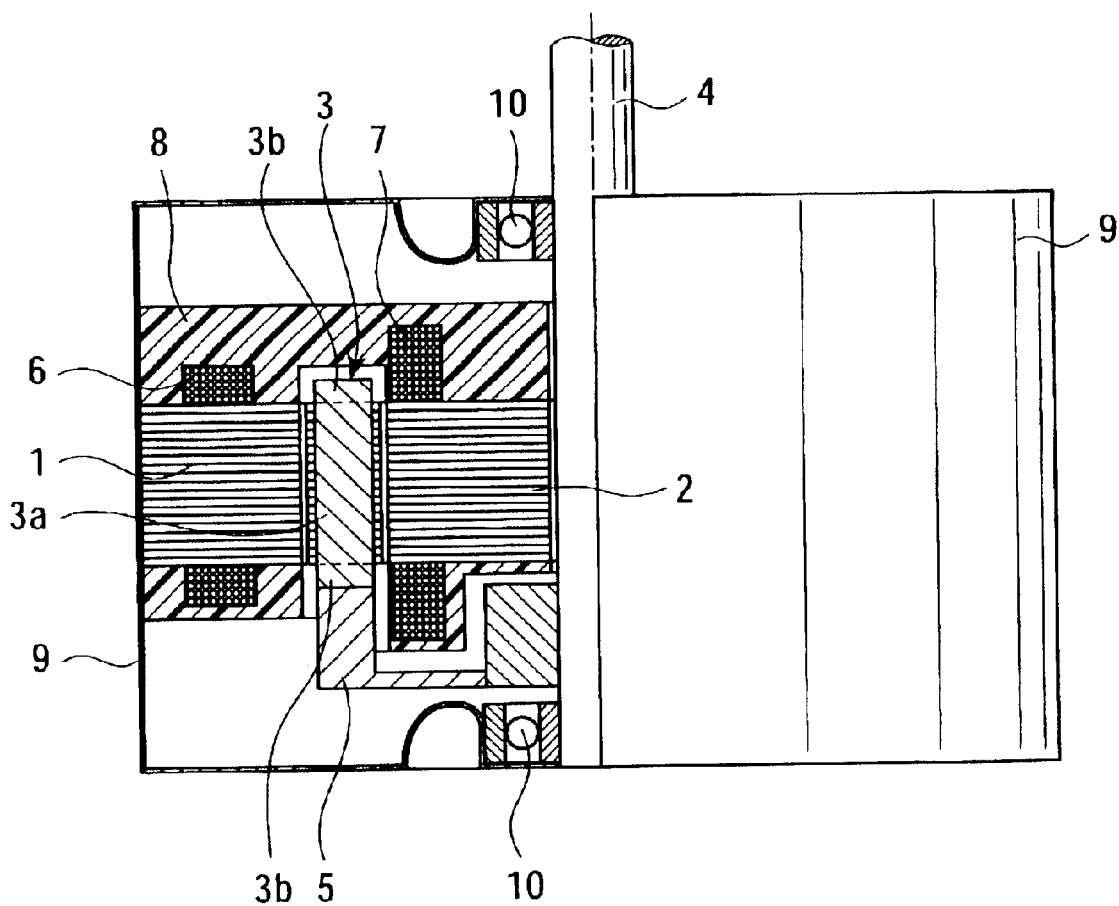
FIG. 2 is a schematic sectional view of the induction motor shown in FIG. 1.
Figure 3:
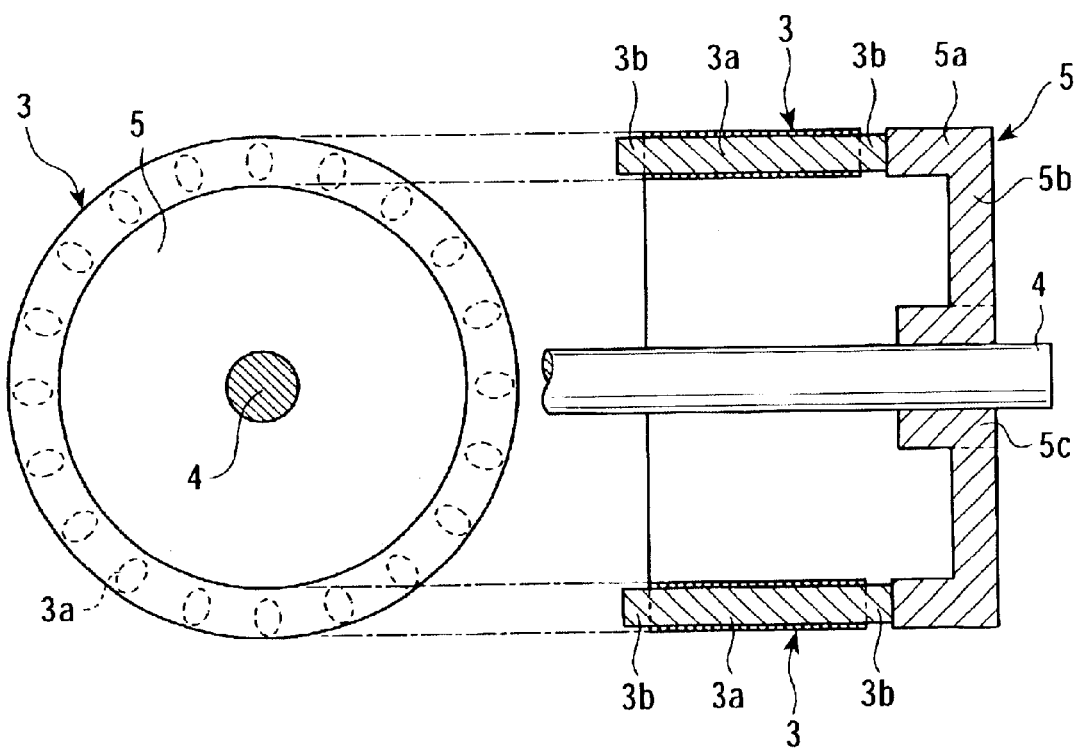
FIG. 3 is an illustration showing a schematic top view and a lateral sectional view of the rotor of the induction motor shown in FIG. 1.

As shown in FIGS. 1 to 3, the induction motor is provided with an outer stator 1, an inner stator 2 set to the inside of the outer stator 1, a rotor 3 set between the outer stator 1 and inner stator 2, and a joint portion 5 with a U-shaped cross section for fixing the rotor 3 to a central rotor shaft 4. That is, air gaps are formed between the inside of the outer stator 1 and the outside of the rotor 3 and between the inside of the rotor 3 and the outside of the inner stator 2 respectively.

The outer stator 1 is constituted by forming a plurality of teeth 1b (e.g. 12 teeth) extending in the direction of the rotor shaft 4 in the circumferential direction at the inside of a cylindrical yoke portion 1a with a predetermined wall thickness at equal intervals and applying concentrated windings 6 to these teeth 1b respectively.

The inner stator 2 is constituted by forming a plurality of teeth 2b (e.g. 12 teeth) radially extending in the circumferential direction at the outside of a cylindrical yoke potion 2a at equal intervals and applying distributed windings 7 to these teeth 2b respectively. The numbers of slots of the outer stator 1 and inner stator 2 are not restricted to 12. It is allowed to use other number of slots.

The rotor 3 has a cylindrical shape with a predetermined wall thickness, which is provided with squirrel-cage windings constituted by arranging a plurality of conductors (e.g. 20 conductors) (conductive metal) 3a formed in parallel with the axial direction of the rotor shaft 4 or at a proper skew angle from the axial direction on the cylindrical portion of the rotor 3 at equal intervals and connecting both ends of the conductors 3a by end rings 3b respectively.

That is, the rotor 3 does not have a yoke but it is constituted by teeth and slots and each slot is elliptic, circular, or trapezoidal to store the conductors 3a in the slots. It is preferable to set the number of slots for storing the conductors 3a to a prime number×2 (10, 14, 22, 26, 34, 38, or 46) or a prime number×4 (20, 28, or 44).

It is allowed to decide diameters of the outer stator 1, inner stator 2, and rotor 3 in accordance with a motor specification or characteristic. Moreover, it is allowed to properly decide the numbers of slots of the outer stator 1 and inner stator 2, the number of stator windings, winding pitch, and the number of slots of the rotor 3 by considering a motor specification or characteristic.

It is preferable to constitute the joint portion 5 with a U-shaped cross section by the same-shape cylindrical portion 5a to be connected to an end of the rotor 3 and a discoid portion 5b for fixing the cylindrical portion 5a to the rotor shaft 4, form a boss 5c at the central portion of the discoid portion 5b, form a hole concentrical and coaxial with the rotor core of the cylindrical portion 5a at the center of the boss 5c, and fix the discord portion 5b to the rotor shaft 4 by shrinkage-fitting the hole.

Moreover, the outer stator 1 provided with the windings 6 and the inner stator 2 provided with the windings 7 are integrated by a thermosetting resin 8 and fixed to the inside of the bracket (shell) 9 of a motor, and the rotor 3 and rotor shaft 4 are held by the bracket 9 through a bearing portion 10.

Then, manufacturing of the outer stator 1, inner stator 2, and rotor 3 is described below. Electromagnetic steel plates are punched in a press die and automatically laminated in the axial direction of the rotor shaft 4. Cores of the rotor 3 are laminated by punching electromagnetic steel plates like hollow disks, closing and punching the outside and inside of each plate as closed slots, and forming teeth and slots. In this case, because slots of the rotor 3 are closed, teeth of the rotor 3 are continuous.

Windings applied to the outer stator 1 and inner stator 2 are obtained by insulating cores of the stators and maintaining them or inserting windings into slots by an inserter, or applying windings directly for teeth 1b and 2b of the outer stator 1 and inner stator 2 or applying toroidal windings to yokes of the stators.

The squirrel-cage windings of the rotor 3 is formed by casting the conductors 3a in closed slots by an aluminum die-cast. At the same time, end rings 3b and 3b are integrally formed on the both ends of the rotor 3, the joint portion 5 is connected to either end ring 3b, and the rotor 3 is fixed to the rotor shaft 4 by the joint portion 5.

The following Table 1 shows results of applying an electromagnetic-field analysis and simulation to the present invention and a conventional example.

TABLE 1

|  | Conventional example | Present invention |
|---|---|---|
| Number of poles | 6 | 6 |
| Rated output (W) | 20 | 20 |
| Rated number of revolutions (rpm) | 720 | 720 |
| Rated frequency (Hz) | 50 | 50 |
| Core laminated length (mm) | 20 | 20 |
| Outer diameter of outer-stator core (mm) | 95 | 95 |
| Diameter of outer air gap (mm) | 55 | 73 |
| Diameter of inner air gap (mm) | — | 62.9 |
| Number of outer-stator grooves | 12 | 12 |
| Outer-stator winding system | Concentrated winding | Concentrated winding |
| Short-pitch winding coefficient of outer stator | sin 45° | sin 45° |
| Number of inner-stator grooves | — | 24 |
| Inner-stator winding system | — | Distributed winding |
| Short-pitch winding coefficient of inner stator | — | sin 67.5° |
| Number of rotor grooves | 22 | 22 |
| $D^2 \times L$ (mm$^3$) | 60.500 | 185.700 |
| Ratio of present invention/conventional example on $D^2 \times L$ (mm$^3$) | 185.700/60.500 = 3.07 | |
| Loss (W) | 41.2 | 15.8 |
| Ratio of present invention/conventional example on loss | 15.8/41.2 = 1/2.61 | |
| Output (W) | 22.2 | 21.6 |
| Input = Output + Loss (W) | 63.4 | 37.4 |
| Efficiency = Output/(Output + Loss) (%) | 35.0 | 57.7 |

As described for the above specific example, according to the present invention, it is possible to obtain an induction motor having an efficiency higher than the prior art by taking the following steps (1) to (10).

(1) Two stators are arranged at the outside and inside of a rotor to form two air gaps.

(2) The diameter of the air gap is made larger than the case of a conventional motor and the value of ($Do^2+Dj^2$) is maximized (approx. 3.07 in the case of the above example).

(3) A magnetic-flux density Bm is decreased to approx. $1/\sqrt{(Do^2+Dj^2)}$ (0.57 in the case of the above example).

(4) The teeth width and yoke width of a stator are decreased proportionally to the magnetic-flux density Bm but the groove area is increased by the value equivalent to decrease of the teeth width and yoke width so that the wire diameter of a wiring can be increased to decrease a wiring resistance.

(5) Windings are applied to the magnetomotive force (AT) of stator windings so that the spatial harmonic of the combined AT between outer stator windings and inner stator windings is minimized.

(6) Therefore, it is not always necessary that the number of teeth of an outer stator core is equal to the number of teeth of an inner stator core.

(7) A stator-winding system uses a winding system such as concentrated winding, distributed winding, or toroidal winding.

(8) It is preferable to apply an open slot for the outside and inside of a rotor core.

However, it is also allowed to concentrically form annular arms or connection rings for connecting all teeth. Moreover, it is allowed to locally connect and laminate all teeth by the rotor core sheet of a closed slot.

(9) A rotor is die-cast by a metal such as aluminum to form squirrel-cage windings. In this case, a discoid boss (joint portion 5) for fixing a rotor to a shaft is integrally die-cast to either-side end ring.

(10) An inner stator and outer stator provided with windings are fixed to a bracket. In this case, a cantilever structure is applied to the inner stator. Or, the inner stator and outer stator respectively provided with windings are integrally formed into a cantilever structure with a resin.

Figure 4:
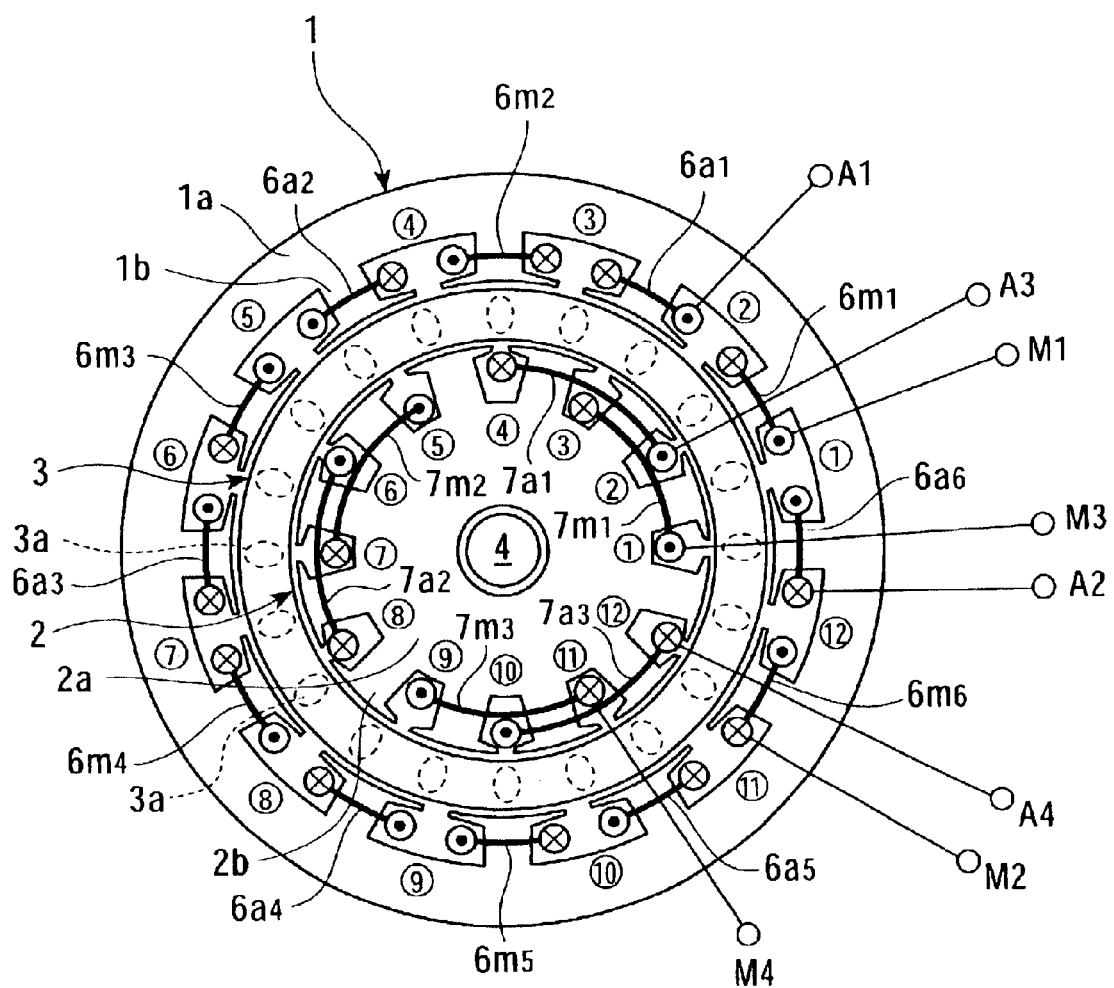
FIG. 4 is a schematic top view of an induction motor of a first embodiment of the present invention.
Figure 5:
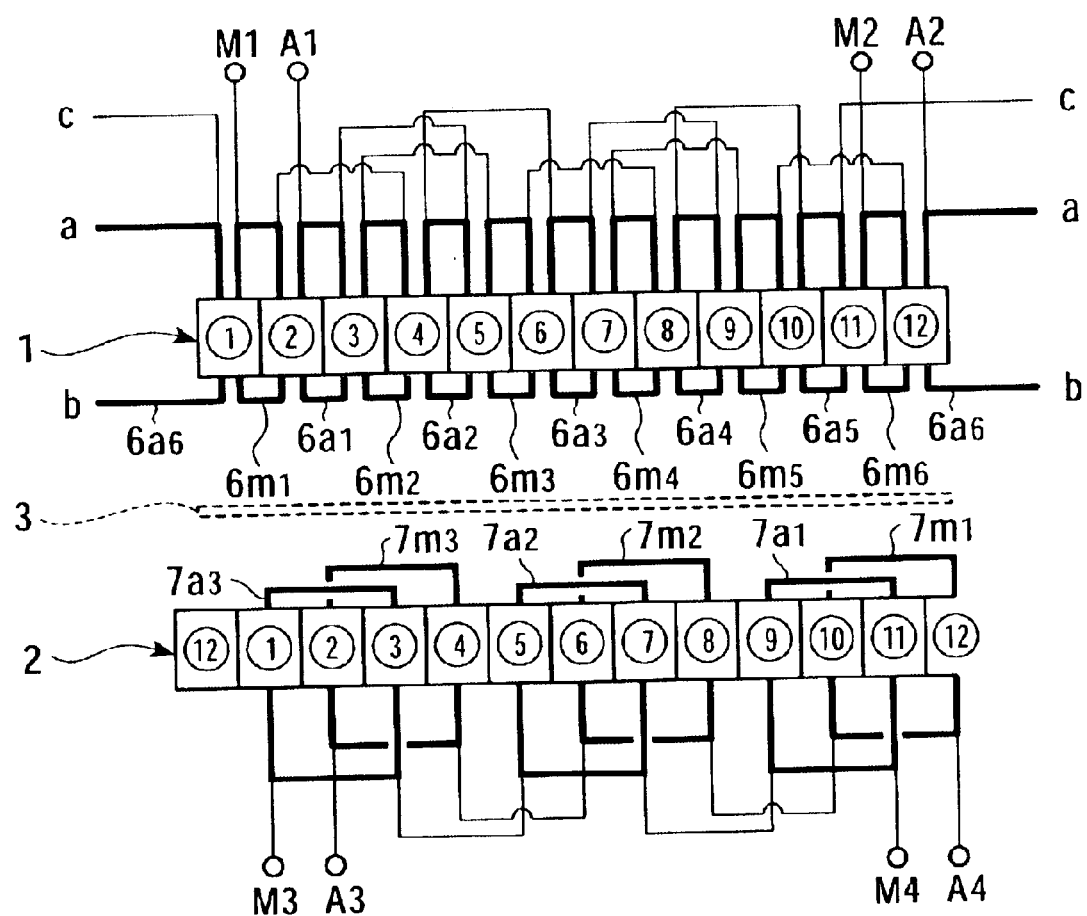
FIG. 5 is a schematic development of stator windings of the induction motor of the first embodiment.
Figure 6:
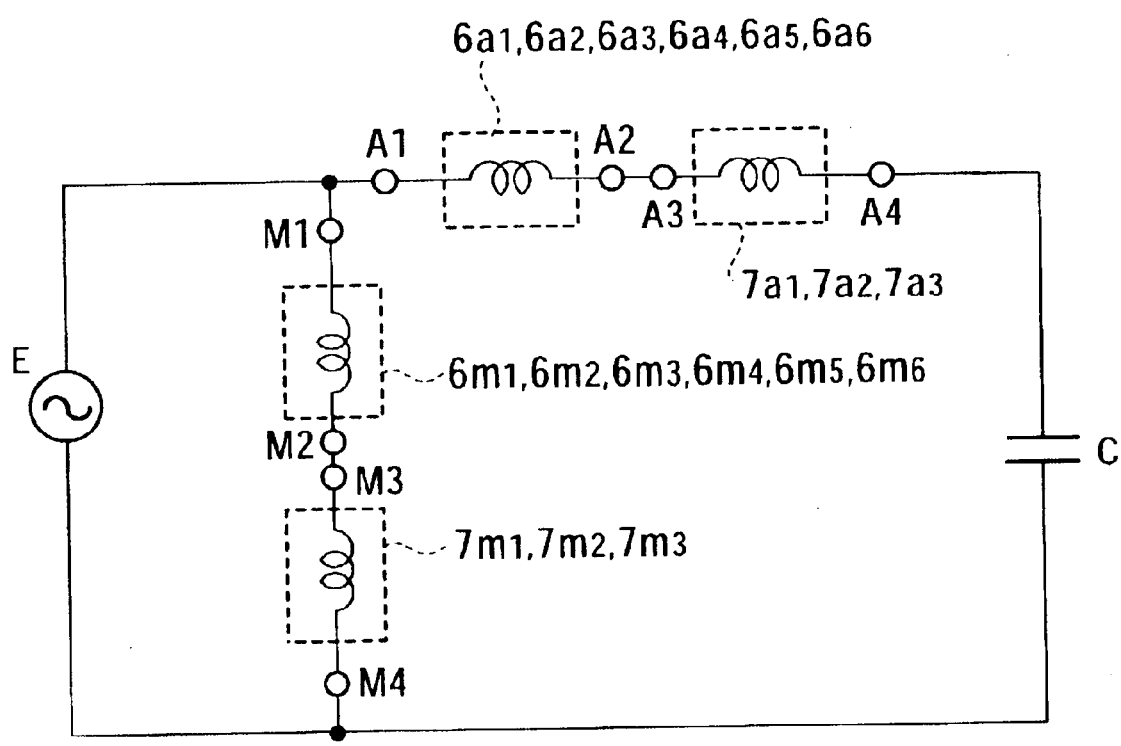
FIG. 6 is a schematic circuit diagram of a wire connection of the stator windings of the induction motor of the first embodiment.

Then, the first embodiment of an induction motor of the present invention is described below by referring to FIGS. 4 to 6. The same portion as that in FIG. 1 is provided with the same symbol and its duplicate description is omitted and a numeral in a circle in FIGS. 4 and 5 denotes each slot number of a stator.

The induction motor is a six-pole capacitor induction motor and an outer stator 1 and an inner stator 2 respectively have the number of teeth 1b and 2b corresponding to the number of poles (e.g. 12 slots). The teeth 1b and 2b are alternately arranged with their spatial phase angles being shifted by $\pi/2$ from each other.

In the case of the outer stator 1, main windings 6m1, . . . , and 6m6 and auxiliary windings 6a1, . . . , and 6a6 are alternately applied to each tooth 1b in the form of a concentrated winding. In the case of the inner stator 2, main windings 7m1, 7m2, and 7m3 and auxiliary windings 7a1, 7a2, and 7a3 are applied to the inner stator 2 in the form of a full-pitch winding.

Main windings 7m1, 7m2, 7m3 and auxiliary windings 7a1, 7a2, and 7a3 extending over two slots are sequentially applied to the inner stator 2 every other slot and the main windings 7m1, 7m2, and 7m3 and the auxiliary windings 7a1, 7a2, and 7a3 are arranged so as to be shifted by one slot.

In the case of main windings, the main windings 6m1, . . . , and 6m6 of the outer stator 1 are sequentially connected in series, the main windings 7m1, 7m2, and 7m3 of the inner stator 2 are sequentially connected in series, and inner and outer main windings are connected in series.

Moreover, in the case of auxiliary windings, the auxiliary windings 6a1, . . . , and 6a6 of the outer stator 1 and the auxiliary windings 7a1, 7a2, and 7a3 of the inner stator 2 are connected the same as the case of the main windings.

In this case, the main windings 6m1, 6m3, and 6m5 and the auxiliary windings 6a1, 6a3, and 6a5 of the outer stator 1 are connected to the main windings 6m2, 6m4 and 6m6 and the auxiliary winding 6a2, 6a4 and 6a6 so that magnetic fluxes in the opposite direction to teeth are generated.

The main windings 7m1, 7m2, and 7m3 and the auxiliary windings 7a1, 7a2, and 7a3 of the inner stator 2 are connected so that magnetic fluxes in the same direction as teeth are generated.

Thereby, the same pole (e.g. S pole) is generated for the rotor 3 by the main windings 6m1, 6m3, and 6m5 of the outer stator 1, an inverted N pole is generated by the main windings 6m2, 6m4, and 6m6 of the outer stator 1, and an N pole is generated by the main windings 7m1, 7m2, and 7m3 of the inner stator 2.

Moreover, the same pole (e.g. N pole) is generated by the auxiliary windings 6a1, 6a3, and 6a5 of the outer stator 1, a reverse pole, that is, an S pole is generated by the auxiliary windings 6a2, 6a4, and 6a6 of the inner stator 2, and an S pole is generated by the auxiliary windings 7a1, 7a2, and 7a3.

Then, a capacitor C (refer to FIG. 6) is connected to the above auxiliary windings in series and main windings are connected to the above series circuit in parallel to apply an AC power E to the parallel circuit. Six magnetic poles are generated in the outer stator 1 and inner stator 2 and the magnetic field rotates. An induced current circulates through the conductor 3a of the rotor 3 in the rotating magnetic field and a torque works on the conductor 3a due to the mutual action between the current and the rotating magnetic field and the rotor 3 rotates.

In the case of the above two-layer radial-air-gap six-pole capacitor induction motor, an effect by two air gaps is obtained as described above. That is, a high efficiency is realized by increasing $D^2L$ to $(Do^2+Di^2)L$ and decreasing $Dm^2$ to reduce losses.

Figure 7:
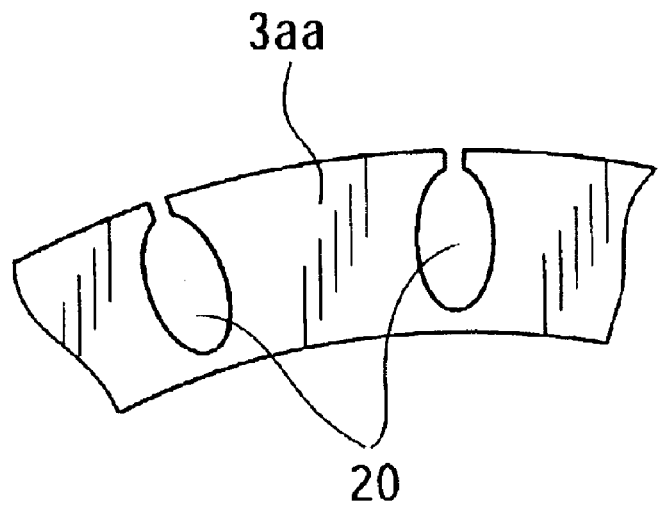
FIG. 7 is a schematic top view of a modification of a rotor slot of an induction motor of the present invention.
Figure 8:
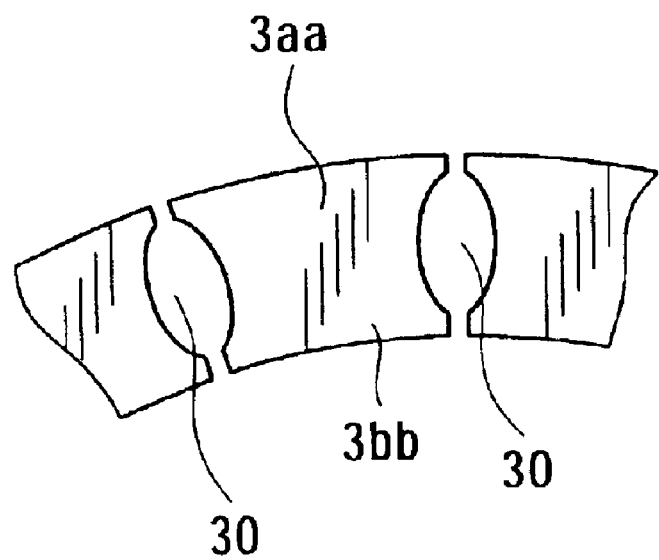
FIG. 8 is a schematic top view of another modification of the rotor slot in FIG. 7.

Though a closed slot is formed on the above rotor 3 in order to store the conductor 3a of the squirrel-cage windings, it is also possible to change the shape of the slot to the open slot shown in FIG. 7 or 8.

The slot shown in FIG. 7 is formed as an open slot 20 obtained by cutting off the outside of the rotor 3. Thereby, because an independent tooth 3aa is formed on the rotor 3, a magnetic flux from a stator is concentrated on the tooth and it is possible to improve an efficiency by effectively using the magnetic flux. Also by using the rotor 3 whose inside is cut off as the open slot 20, the above advantage can be obtained.

Moreover, as shown in FIG. 8, the shape of the slot can be changed to an open slot 30 obtained by cutting off the both ends of the outside and inside of the rotor 3. Thereby, independent teeth 3aa and 3bb are formed on the outside and inside of the rotor 3 and thereby, a magnetic flux is used more effectively than a slot only whose one end is open.

In this case, the open slot 20 or 30 is formed in order to obtain the rotor 3 by punching electromagnetic steel plates and laminating them in the axial direction of the rotor shaft 4. When using the rotor 3 on which the open slot 30 is formed, electromagnetic steel plates some of which are formed into closed slots (that in the first embodiment) are used.

Figure 9:
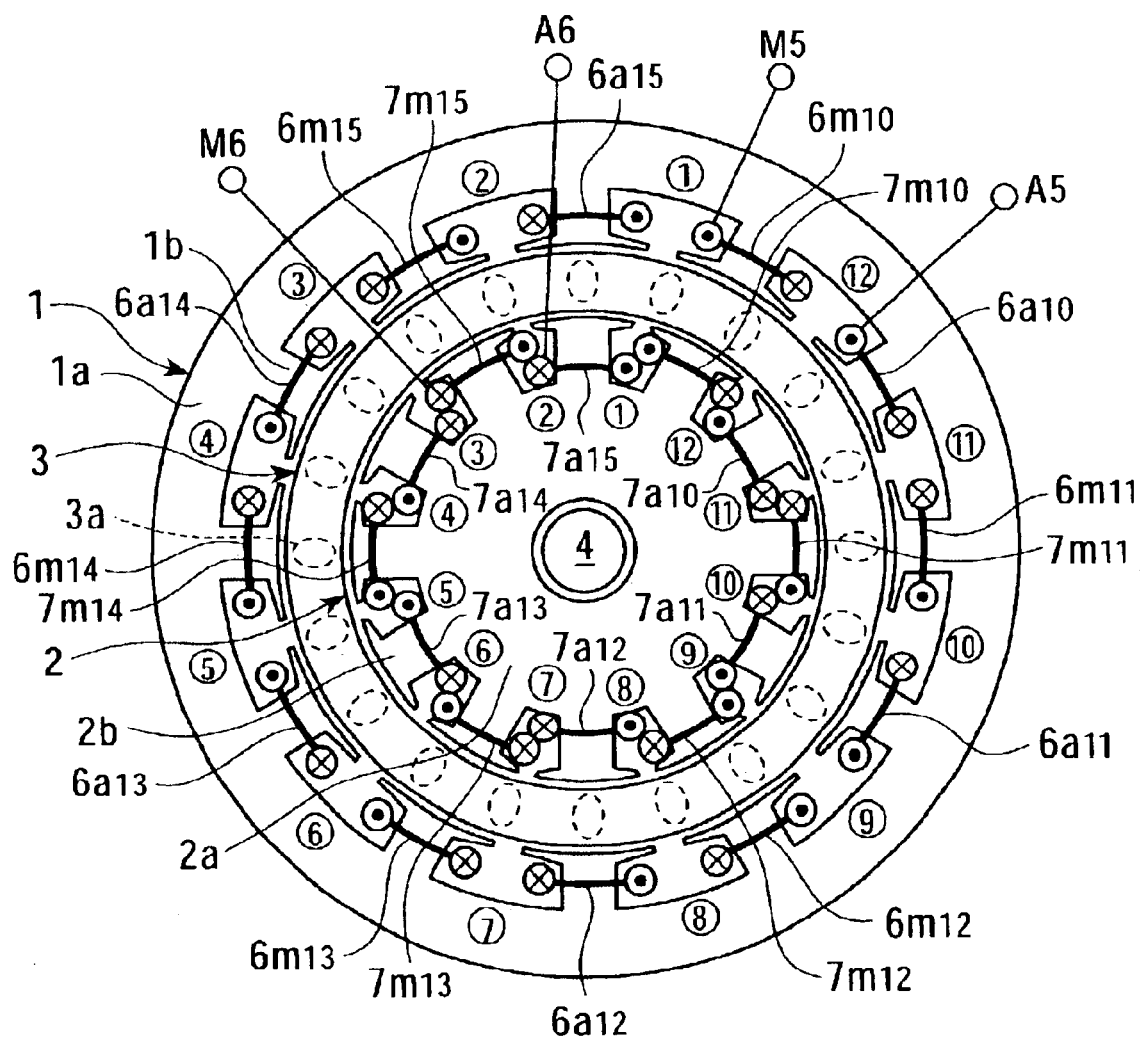
FIG. 9 is a schematic top view of an induction motor of a second embodiment of the present invention.
Figure 10:
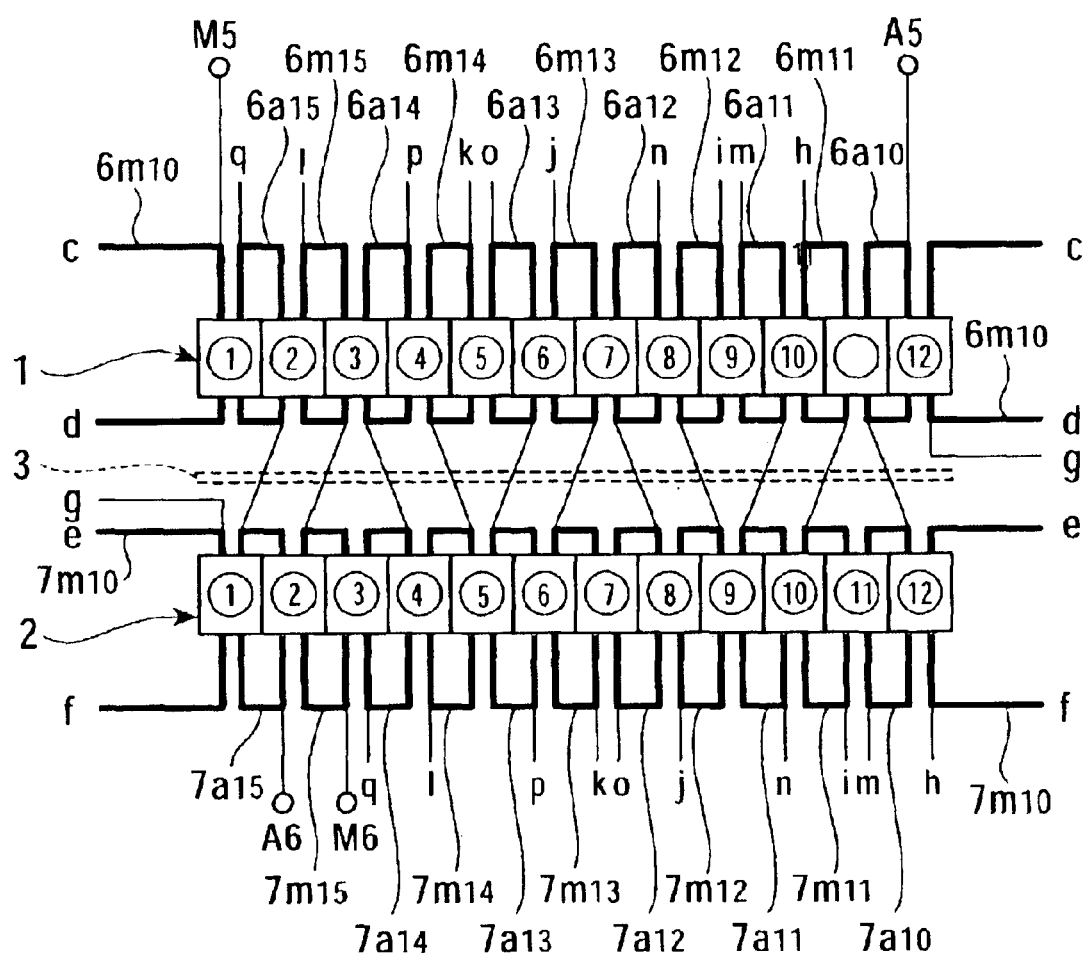
FIG. 10 is a schematic development of stator windings of the induction motor of the second embodiment.
Figure 11:
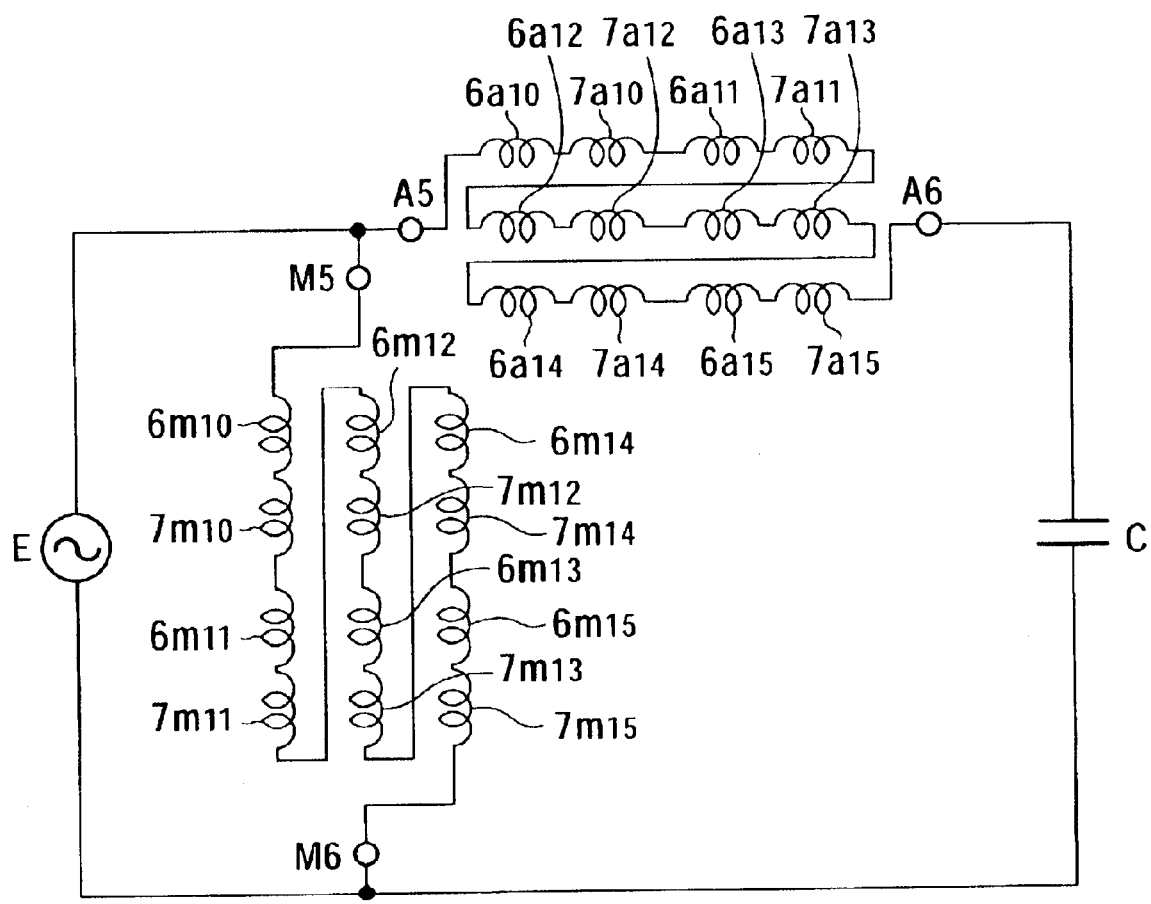
FIG. 11 is a schematic circuit diagram of a wire connection of the stator windings of the induction motor of the second embodiment.

FIGS. 9 to 11 are a schematic top view, schematic development, and schematic wire-connection circuit diagram showing the second embodiment of the present invention respectively. A portion same as that in FIG. 1 is provided with the same symbol and its duplicate description is omitted. Moreover, in FIGS. 9 and 10, a numeral in a circle denotes a slot number same as the case of the first embodiment.

The above induction motor is a six-pole capacitor induction motor and its outer stator 1 and inner stator 2 respectively have teeth 1b and 2b which are equal to the number of teeth of the first embodiment, in which the teeth 1b and 2b are opposite to each other.

Main windings 6m10, . . . , and 6m15 and the auxiliary windings 6a10, . . . , and 6a15 are alternately applied to each tooth 1b of the outer stator 1 in the form of a concentrated winding the same as the case of the first embodiment. In the case of the inner stator 2, main windings 7m10, . . . , and 7m15 and the auxiliary windings 7a10, . . . , and 7m15 are alternately applied to the inner stator 2 in the form of a concentrated winding the same as the case of the windings of the outer stator 1.

Main windings 7m10, 7m12, and 7m14 and the auxiliary windings 7a10, 7a12, and 7a14 of the inner stator 2 are provided in the form of a concentrated winding the same as the case of the main windings and the auxiliary windings of the outer stator 1.

The main windings of the outer stator 1 and the main windings of the inner stator 2 are alternately connected, that is, the main windings 6m10, 7m10, 6m11, 7m11, . . . , 6m15, and 7m15 are sequentially connected in series. Moreover, auxiliary windings are connected the same as the case of the main windings, that is, the auxiliary windings 6a10, 7a10, 6a11, 7a11, . . . , 6a15, and 7a15 are sequentially connected in series.

In this case, the main windings 6m10, 6m12, and 6m14 and the auxiliary windings 6a10, 6a12, and 6a14 of the outer stator 1 are connected so as to generate magnetic fluxes in the same direction as teeth and the main windings 6m11, 6m13, and 6m15 and the auxiliary windings 6a11, 6a13, and 6a15 are connected so as to generate magnetic fluxes in the same direction as teeth. Moreover, the above windings with even suffixes and windings with odd suffixes are connected so as to generate magnetic fluxes in the direction opposite to each other.

Similarly to the above outer stator 1, the main windings 7m10, 7m12, and 7m14 and the auxiliary windings 7a10, 7a12, and 7a14 of the inner stator 2 are connected so as to generate magnetic fluxes in the same direction as teeth and the main windings 7m11, 7m13, and 7m15 and the auxiliary windings 7a11, 7a13, and 7a15 are connected so as to generate magnetic fluxes in the same direction as teeth.

Moreover, the main windings 7m10, 7m12, and 7m14 and the auxiliary windings 7a10, 7a12, and 7a14 and the main windings 7m11, 7m13, and 7m15 and the auxiliary windings 7a11, 7a13, and 15 are connected so as to generate magnetic fluxes in opposite directions to each other.

Thereby, the same pole (e.g. S pole) is generated by the main windings 6m10, 6m12, and 6m14 of the outer stator 1, a reverse pole, that is, an N pole is generated by the main windings 6m11, 6m13, and 6m15, an N pole is generated by the main windings 7m10, 7m12, and 7m14 of the inner stator 2, and an S pole is generated by the main windings 6m11, 6m13, and 6m15 of the inner stator.

That is, when the direction of a magnetic flux in the tooth 1b of the outer stator 1 is the central direction, the direction of the magnetic flux in the tooth 2b of the inner stator 2 opposite to the tooth 1b is also the central direction.

Moreover, because auxiliary windings are the same as the case of main windings, the same pole (e.g. N pole) is generated by the auxiliary windings 6a10, 6a12, and 6a14 of the outer stator 1, a reverse pole, that is, an S pole is generated by the auxiliary windings 6a11, 6a13, and 6a15 of the stator 1, an S pole is generated by the auxiliary windings 6a10, 6a12, and 6a14 of the inner stator 2, and an N pole is generated by the auxiliary windings 7a11, 7a13, and 7a15 of the stator 2.

Then, similarly to the case of the above first embodiment, a capacitor C is connected to auxiliary windings in series, main windings is connected to the series circuit in parallel, and an AC power E is applied to the parallel circuit. Then, six magnetic poles are generated by the outer stator 1 and inner stator 2 and the magnetic field rotates.

An induced current circulates through the conductor 3a of the rotor 3 present at the rotating magnetic field and a torque works on the conductor 3a by the mutual action between the current and the rotating magnetic field and the rotor 3 rotates. Therefore, in the case of the present invention, the same advantage as the case of the first embodiment is obtained though the main windings and auxiliary windings of the outer stator 1 and inner stator 2 are concentrated windings.

Figure 12:
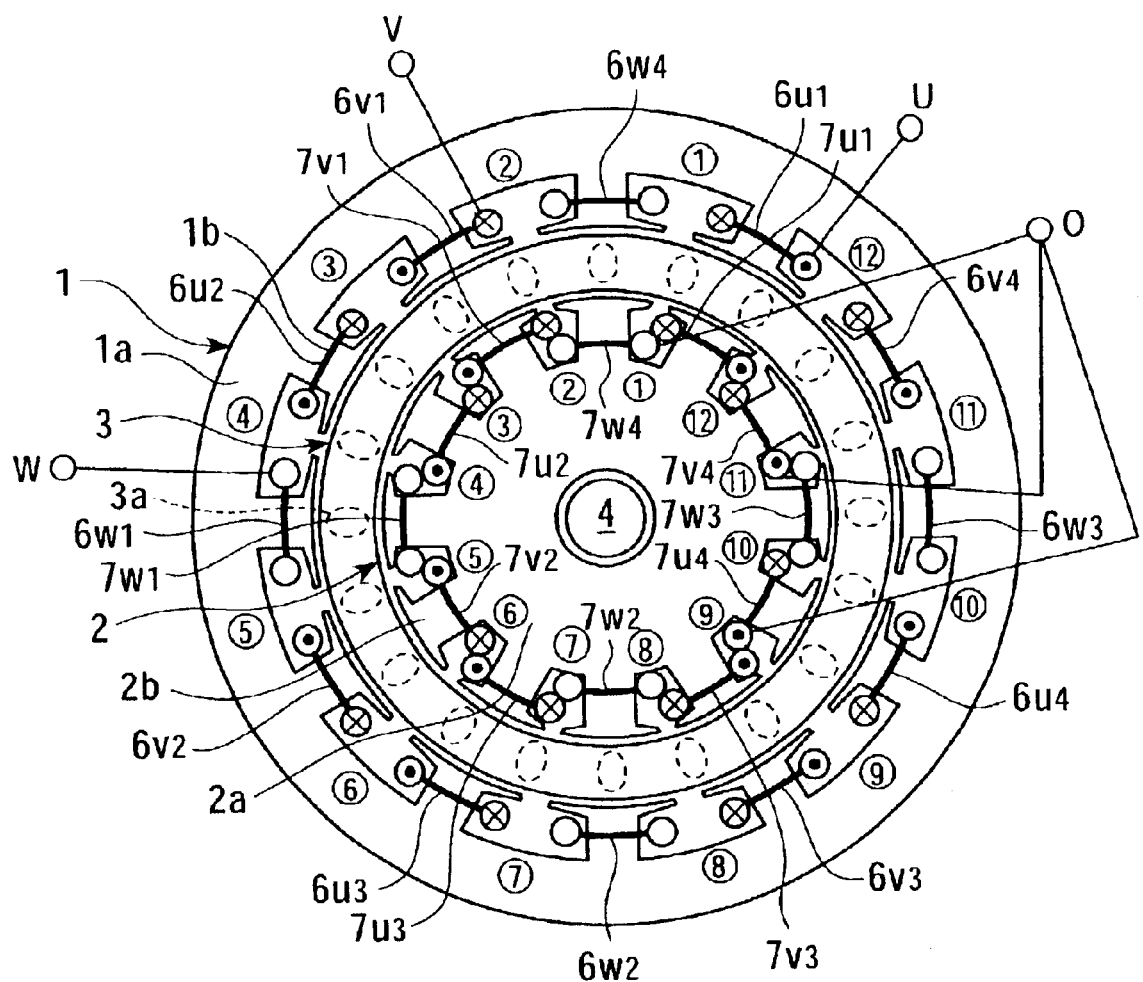
FIG. 12 is a schematic top view of an induction motor of a third embodiment of the present invention.
Figure 13:
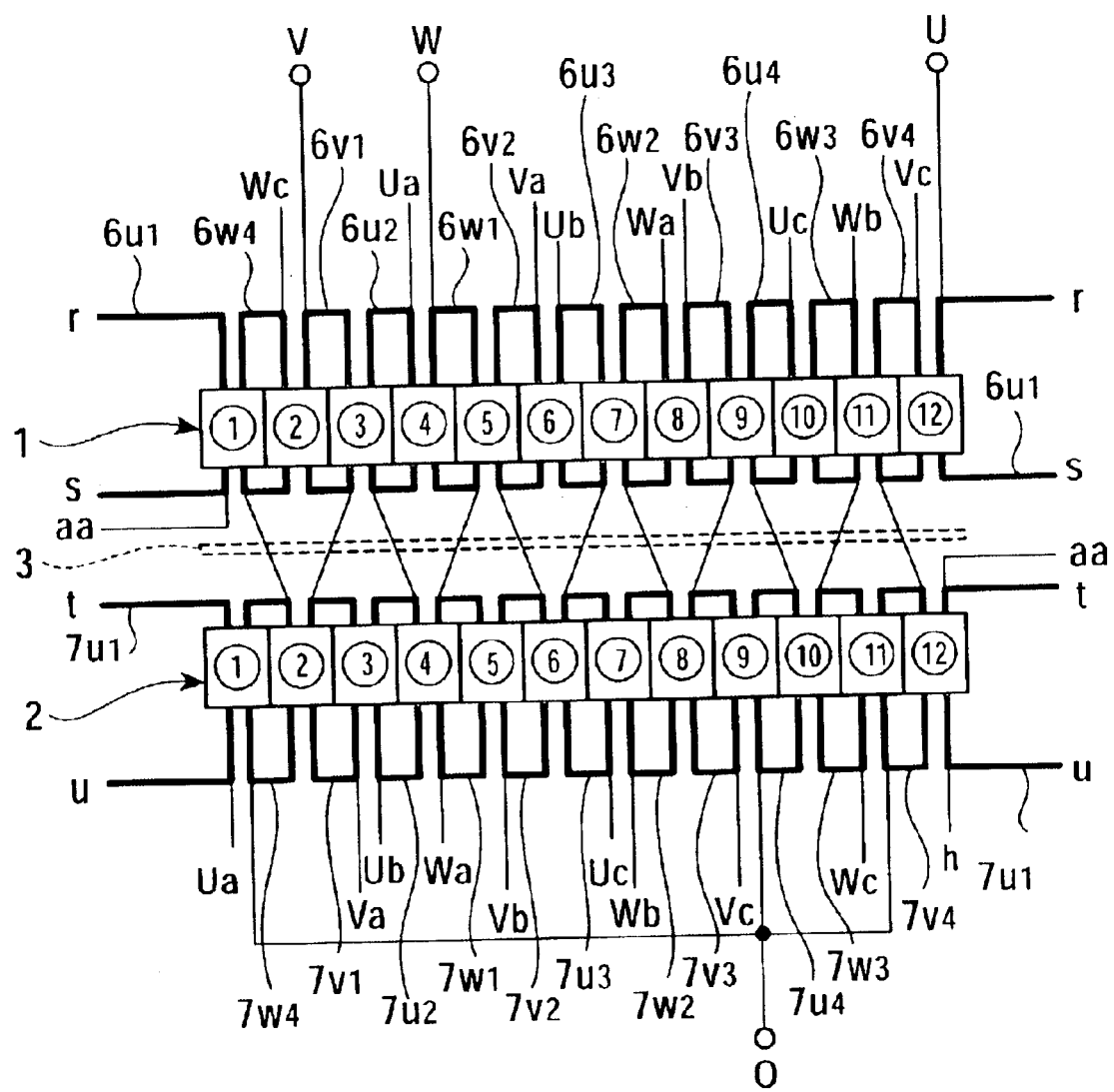
FIG. 13 is a schematic development of stator windings of the induction motor of the third embodiment.
Figure 14:
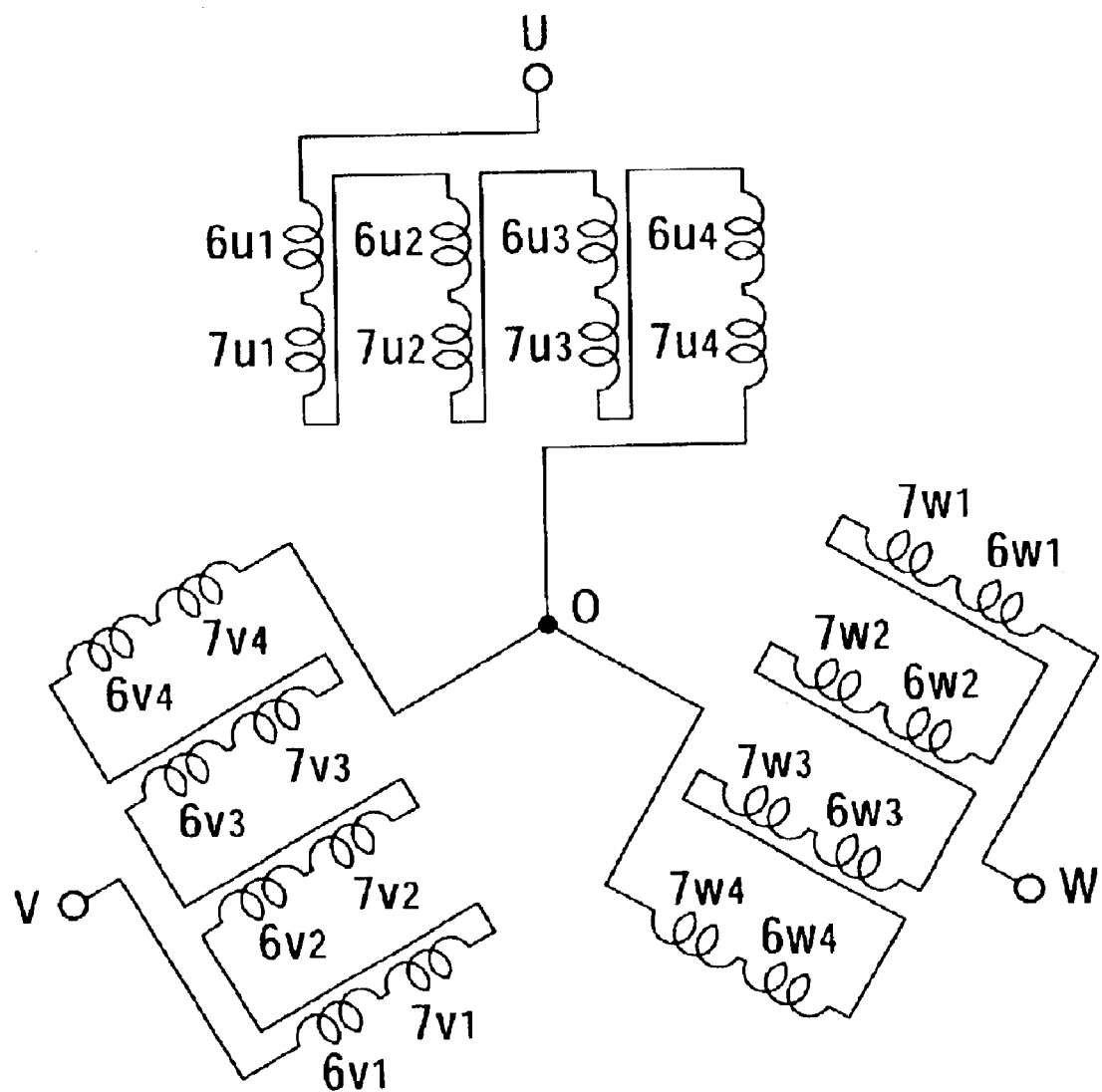
FIG. 14 is a schematic circuit diagram of a wire connection of the stator windings of the induction motor of the third embodiment.

FIGS. 12 to 14 are a schematic top view, a schematic development, and a schematic wire-connection diagram showing the third embodiment of the present invention respectively. In FIGS. 12 and 13, a numeral in a circle denotes a slot number same as the case of the second embodiment and a potion same as that in FIG. 1 is provided with the same symbol and its duplicate description is omitted.

The induction motor is a three-phase four-pole induction motor whose outer stator 1 and inner stator 2 have teeth 1b and 2b which are equal to the number of teeth of the second embodiment and are faced each other.

U-phase windings 6u1 to 6u4 and 7u1 to 7u4, V-phase windings 6v1 to 6v4 and 7v1 to 7v4, and W-phase windings 6w1 to 6w4 and 7w1 to 7w4 are applied to the teeth 1b and 2b of the outer stator 1 and inner stator 2 in the form of a concentrated winding respectively every three slots. Moreover, for windings of the outer stator 1 and inner stator 2, the windings of each phase are arranged so as to be faced each other.

The windings 6u1, 6w4, 6v1, 6u2, 6w1, . . . , 6w1, and 7v4 are applied to the outer stator 1 in order and windings are applied to the inner stator 2 in order the same as the case of the windings of the outer stator 1. The windings 6u1, 7u1, 6u2, . . . 6u4, and 7u4 are sequentially connected in series in the case of U phase, the windings 6v1, 7v1, 6v2, . . . , 6v4, and 7v4 are sequentially connected in series two slots separately from the U-phase windings in the case of V phase, and the windings 6w1, 7w1, 6w2, . . . , 6w4, and 7w4 are sequentially connected in series four slots separately from the U-phase windings in the case of W phase.

In this case, for the outer stator 1, the windings 6u1, 6u3, 6v1, 6v3, 6w1, and 6w3 are connected so as to generate magnetic fluxes in the same direction as teeth and the windings 6u2, 6u4, 6v2, 6v4, 6w2, and 6w4 are connected so as to generate magnetic fluxes in the same direction as teeth.

Moreover, in the case of the windings of the inner stator 2, the windings 7u2, 7u4, 7v2, 7v4, 7w2, and 7w4 are connected so as to generate magnetic fluxes in the same direction as teeth and the windings 7u1, 7u3, 7v1, 7v3, 7w1, and 7w3 are connected so as to generate magnetic fluxes in the same direction as teeth.

Then, U-phase, V-phase, and W-phase windings are Y-connected, that is, one-hand ends of the windings 7u4, 7v4, and 7w4 are connected to each other to supply a three-phase AC current to the windings or supply a two-phase current to the windings by a 120°-power-distribution three-phase-inverter power source as described below.

For example, as shown in FIG. 14, when supplying power to the U phase and V phase, the same pole (e.g. S pole) is generated in the rotor 3 by the U-phase windings 6u1 and 6u3 of the outer stator 1, an N pole is generated by the U-phase windings 6u2 and 6u4, an N pole is generated by the V-phase windings 6v1 and 6v3, and an S pole is generated by the V-phase windings 6v2 and 6v4.

Moreover, a magnetic flux in the same direction as the U winding of the outer stator 1 is generated in the U-phase windings of the inner stator 2, that is, an N pole is generated in the rotor 3 by the U-phase windings 7u1 and 7u3, and S pole is generated by the U-phase windings 7u2 and 7u4.

In the case of V-phase windings, an S pole is generated by the V-phase windings 7v1 and 7v3 and an N pole is generated by the V-phase windings 7v2 and 7v4.

By changing power distributions so as to distribute power to two phases out of the above three phases, four magnetic poles are generated in the outer stator 1 and inner stator 2 and the magnetic field rotates. An induced current circulates through the conductors 3a of the rotor 3 present in the rotating magnetic field, a toque works on the conductors 3a due to the mutual action between the current and the rotating magnetic field, and the rotor 3 rotates. Therefore, the same advantage as the case of the induction motor of the above embodiment is obtained.

Figure 15:
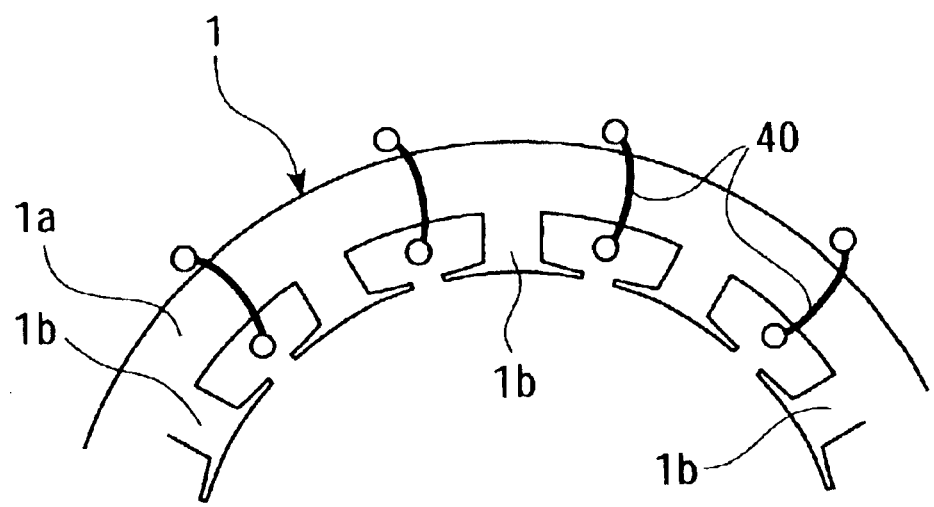
FIG. 15 is a schematic top view of a modification of stator windings of an induction motor of the present invention.
Figure 16:
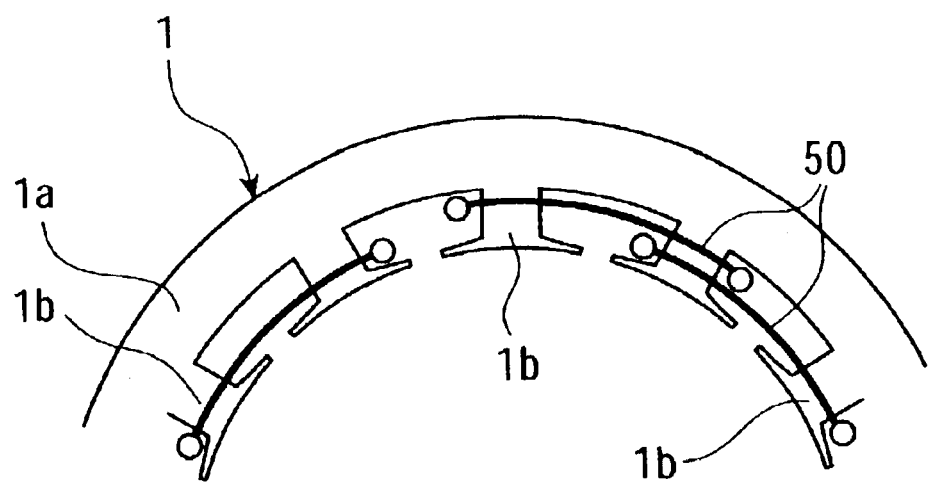
FIG. 16 is a schematic top view of another modification of stator windings of an induction motor of the present invention.

In the case of the embodiments above described, windings of the outer stator 1 are concentrated windings. However, a toroidal winding 40 is applied to the yoke portion 1a through a slot as shown in FIG. 15 or a winding 50 is applied to a predetermined portion as the case of the winding of the inner stator 2 of the first embodiment.

Moreover, though the number of slots of the outer stator 1 is made equal to the number of slots of the inner stator 2, it is also allowed to make the number of slots of the outer stator 1 different from the number of slots of the inner stator 2. Furthermore, though the winding pitch of the outermost diameter portion is equal to the winding pitch of the innermost diameter portion in the case of the second and third embodiments, it is also allowed to make the former pitch different from the latter pitch the same as the case of the first embodiment.

Figure 17:
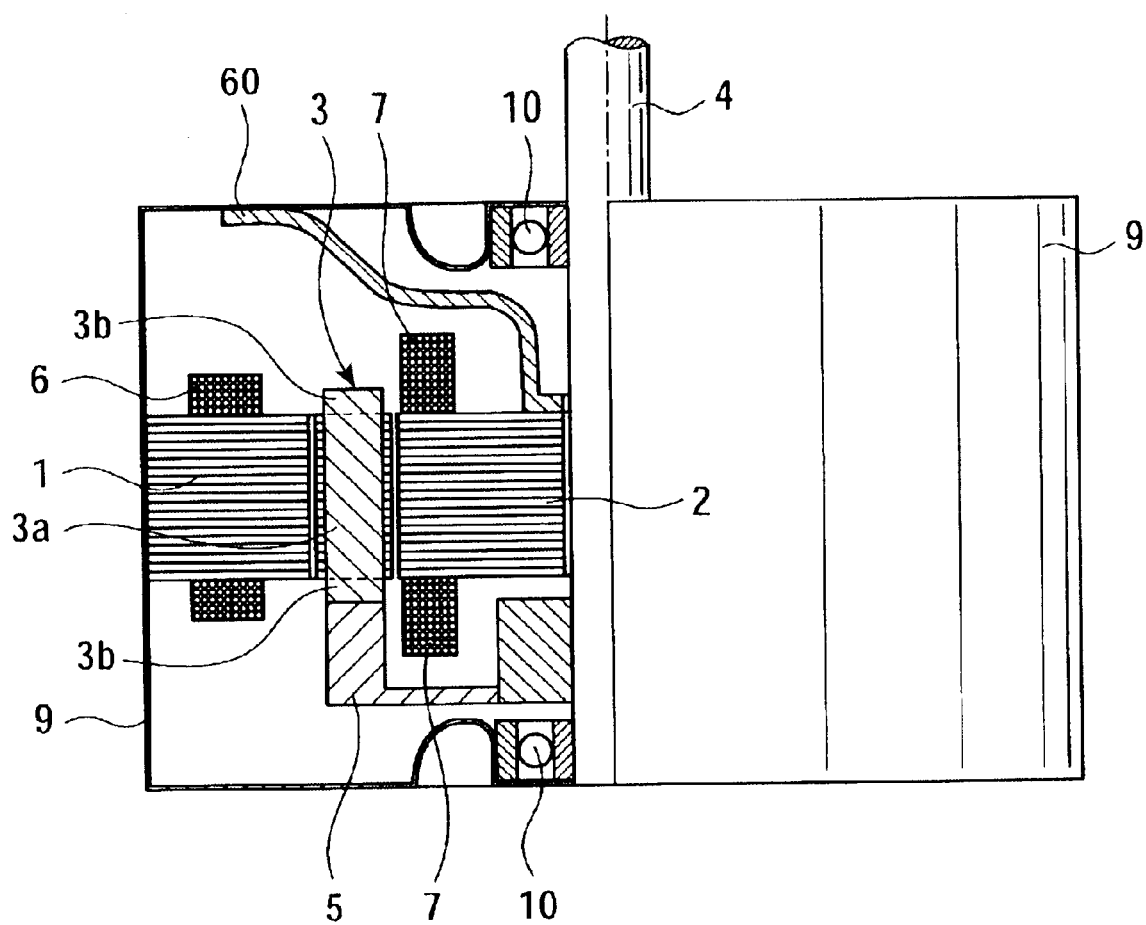
FIG. 17 is a schematic lateral sectional view of a modification of stator holding means of an induction motor of the present invention.

Furthermore, though two stators are integrally formed by the thermosetting resin 8 (refer to FIG. 2), it is also allowed to fix the inner stator 2 to the inner face of the bracket 9 by a holding portion 60 or fix the stator 2 to a bearing housing portion as shown in FIG. 17. In this case, for the outer stator 1, the inner diameter fitting portion of the outer diameter portion of the bracket 9 is fixed.

What is claimed is:

1. An induction motor comprising:

an outer stator serving as an outermost-diameter-portion stator and having outer windings and first grooves, an inner stator serving as an innermost-diameter-portion stator and having inner windings and second grooves, an a rotor situated between the outer stator and the inner stator to have radial air gaps to the outer stator and the inner stator and having squirrel-cage windings so that the rotor receives rotating magnetic fields from the outer and inner windings, wherein a number of the first grooves of the outer stator is equal to 2n×(number of poles) (n: positive integer) and first main windings and first auxiliary windings are alternately applied to teeth between the first grooves of the outer stator, a number of the second grooves of the inner stator is equal to 2m×(number of poles) (m: positive integer) and second main windings and second auxiliary windings same as those used for the outer stator are alternately applied to teeth between the second grooves of the inner stator, the first main windings of the outer stator and the second main windings of the inner stator are arranged so that magnetic fluxes in a same direction are generated, and connected in series so that the magnetic fluxes generated by adjacent main windings have directions opposite to each other, the first auxiliary windings of the outer stator and the second auxiliary windings of the inner stator are arranged so that magnetic fluxes in a same direction are generated, and connected in series so that the magnetic fluxes generated by adjacent auxiliary windings have directions opposite to each other, the first and second main windings of the outer and inner stators connected in series are used as main windings of a capacitor induction motor, and the first and second auxiliary windings of the outer and inner stators connected in series are used as auxiliary winding of the capacitor induction motor.

2. An induction motor according to claim 1, wherein the number of the grooves of the outer stator is equal to or different from the number of the grooves of the inner stator, and a number of grooves of the rotor is equal to a prime number×2 or a prime number×4.

3. An induction motor according to claim 1, wherein a pitch between the outer windings applied to an inside of the outer stator is made equal to or different from a pitch between the inner windings applied to an outside of the inner stator.

4. An induction motor according to claim 1, wherein the outer stator and the inner stator are constituted by insulating cores and the windings are formed in the grooves.

5. An induction motor according to claim 1, wherein the rotor is provided with a core having at least teeth, slots and the squirrel-cage windings formed through the slot, the core is constituted by a laminated body obtained by laminating a plurality of electromagnetic steel plates in an axial direction of a rotor shaft, and the squirrel-cage windings are formed at the slots by a conductive metal.

6. An induction motor according to claim 1, wherein the outer stator and the inner stator provided with the windings are integrally solidified by a thermosetting resin and fixed to an inside of a bracket.

7. An induction motor according to claim 1, wherein the outer stator is fixed to an inner-diameter fitting portion of a bracket, and the inner stator is fixed to an inside of the bracket or a bearing housing portion of a shaft through a holding portion.

8. An induction motor according to claim 1, wherein the rotor includes a core having an outer end and an inner end, which can be opened or closed.

9. An induction motor comprising:

an outer stator serving as an outermost-diameter-portion stator and having outer windings, an inner stator serving as an innermost-diameter-portion stator and having inner windings, and a rotor situated between the outer stator and the inner stator to have radial air gaps to the outer stator and the inner stator and having squirrel-cage windings so that the rotor receives rotating magnetic fields from the outer and inner windings, wherein the outer stator and the inner stator have numbers of grooves equal to or different from each other, main windings and auxiliary windings of the outer windings are applied to teeth formed at an inside of the outer stator in a form of a concentrated winding, and main windings and auxiliary windings of the inner windings are applied to grooves formed at an outside of the inner stator in a form of a distributed winding, rotating magnetic fields being generated in the outer and inner stators to form a capacitor induction motor in which an induced current circulates through the squirrel-cage windings of the rotor in accordance with the rotating magnetic field.

10. An induction motor according to claim 9, wherein a number of grooves of each of the stators is set to a value equal to 2×[number of poles], the main windings and auxiliary windings equal to a number of poles are applied to the teeth of the outer stator in the form of the concentrated winding by shifting a spatial phase angle by n/2 in terms of an electrical angle, the windings are applied to the grooves of the inner stator in a form of a full-pitch winding of a two-slot pitch so that centers of magnetic poles of the main and auxiliary windings coincide with the outer stator, all main and auxiliary windings of the outer stator and inner stator are connected in series, and a capacitor is connected to an auxiliary winding side in series.

11. An induction motor comprising:

an outer stator serving as an outermost-diameter-portion stator and having outer windings, an inner stator serving as an innermost-diameter-portion stator and having inner windings, and a rotor situated between the outer stator and the inner stator to have radial air gaps to the outer stator and the inner stator and having squirrel-cage windings so that the rotor receives rotating magnetic fields from the outer and inner windings, wherein the outer stator and the inner stator respectively have slots equal to 3×[number of poles] to make teeth formed at an inside of the outer stator face teeth formed at an outside of the inner stator, and three-phase windings are applied to the teeth of the outer stator and the inner stator in a form of a concentrate winding to generate a rotating magnetic filed, to thereby form a three-phase induction motor in which an induced current circulates through the squirrel-cage windings of the rotor in accordance with the rotating magnetic field.

12. An induction motor according to claim 11, wherein the outer stator has grooves equal to 3n×[number of poles] (n: positive integer) and the three-phase windings are sequentially applied to the teeth of the outer stator, the inner stator has grooves equal to 3m×[number of poles] (m: positive integer) and three-phase windings are sequentially applied to the teeth of the inner stator, in each phase of the windings, the windings of the outer stator are connected with the windings of the inner stator in series and the windings of the outer stator and corresponding windings of the inner stator are arranged so that magnetic fluxes in a same direction are generated, and the windings of the phases are connected in series so that magnetic fluxes in directions opposite to each other are generated by adjacent windings and the windings of the phases connected in series are three-phase-connected.

13. An induction motor comprising:

an outer stator serving as an outermost-diameter-portion stator and having outer windings, an inner stator serving as an innermost-diameter-portion stator and having inner windings, and a rotor situated between the outer stator and the inner stator to have radial air gaps to the outer stator and the inner stator and having squirrel-cage windings so that the rotor receives rotating magnetic fields from the outer and inner winding wherein the outer stator and the inner stator respectively have slots equal to a number of poles to make teeth formed at an inside of the outer stator face teeth formed at an outside of the inner stator by shifting a spatial phase angle by $\pi/2$ in terms of an electrical angle, and main windings and auxiliary windings are formed to the teeth of the outer stator and the inner stator in a form of a concentrated winding to generate rotating magnetic field, to thereby form a capacitor induction motor in which an induced current circulates through the squirrel-cage windings of the rotor in accordance with the rotating magnetic field.

* * * * *